(12) United States Patent  (10) Patent No.: US 6,457,460 B1
Doane et al.  (45) Date of Patent: Oct. 1, 2002

(54) FUEL DELIVERY SYSTEM WITH RECIRCULATION COOLER

(75) Inventors: Kirk D. Doane; Jason D. Hatton, both of Essexville; Edward J. Talaski, Caro, all of MI (US)

(73) Assignee: Walbro Corporation, Cass City, MI (US)

( * ) Notice: Subject to any disclaimer, the term of this patent is extended or adjusted under 35 U.S.C. 154(b) by 0 days.

(21) Appl. No.: 09/711,467

(22) Filed: Nov. 13, 2000

(51) Int. Cl.$^7$ ............................................... F02M 37/04
(52) U.S. Cl. ........................ 123/541; 123/497; 123/514
(58) Field of Search ............................. 123/497, 41.31, 123/541, 516, 514

(56) References Cited

U.S. PATENT DOCUMENTS

| | | | |
|---|---|---|---|
| 4,084,564 A | * 4/1978 | Rickert | 123/541 |
| 4,411,239 A | * 10/1983 | Kelch | 123/557 |
| 4,872,438 A | * 10/1989 | Ausiello et al. | 123/514 |
| 5,120,201 A | 6/1992 | Tuckey et al. | |
| 5,219,277 A | 6/1993 | Tuckey | |
| 5,257,916 A | 11/1993 | Tuckey | |
| 5,579,739 A | 12/1996 | Tuckey et al. | |
| 5,794,598 A | * 8/1998 | Janik et al. | 123/514 |
| 5,832,903 A | * 11/1998 | White et al. | 123/514 |
| 5,964,206 A | * 10/1999 | White et al. | 123/541 |
| 6,234,151 B1 | * 5/2001 | Eck | 123/514 |

* cited by examiner

Primary Examiner—Thomas Moulis
(74) Attorney, Agent, or Firm—Reising, Ethington, Barnes, Kisselle, Learman & McCulloch P.C.

(57) ABSTRACT

A fuel system for a marine engine has a recirculation cooler which receives a portion of fuel discharged from a fuel pump, cools that fuel, and then returns the cooled fuel to the inlet of the fuel pump to reduce fuel vapor formation and to cool the pump as the cooled fuel flows through the pump. The recirculation cooler is preferably formed of a material of high thermal conductivity and has a water passage adjacent to the fuel passage to reduce the temperature of the fuel that flows through the recirculation cooler. The recirculation cooler is preferably used in high heat applications or with a speed controlled fuel pump, with a pulse width modulated drive, for example. In these applications, during at least some fuel flow conditions, the flow of fuel through the fuel pump may be insufficient to cool the fuel pump motor and may cause increased fuel vapor formation. Desirably, the cooler fuel provided from the recirculation cooler to the inlet of the fuel pump supplements the cooling of the fuel pump motor and reduces fuel vapor formation.

38 Claims, 3 Drawing Sheets

FUEL DELIVERY SYSTEM WITH RECIRCULATION COOLER

FIELD OF THE INVENTION

This invention relates generally to a fuel delivery system and more particularly to a returnless fuel delivery system.

BACKGROUND OF THE INVENTION

Electric motor fuel pumps have been used to deliver fuel to engines in a wide range of applications. In some systems, the armature of the electric motor and stator are disposed downstream of a fuel pumping assembly. Fuel is drawn into the pumping assembly and discharged therefrom under pressure into a fuel pump housing such that the fuel flow through the housing is in contact with the electric motor to cool it. In some high heat applications or conditions, this fuel flow through the pump is insufficient to cool the fuel pump. Some prior marine engine fuel systems have tried to supplement the cooling of the pump by installing the pump in a fuel reservoir and then cooling the reservoir with a water jacket through which cool water is circulated.

This fuel reservoir and water jacket system is inadequate in many applications to sufficiently cool the pump. For example, with a speed controlled. fuel pump, such as when a pulse width modulated drive is used to control the operation of the pump and hence, the fuel flow rate delivered from the fuel pump. With such a pulse width modulated drive or other variably controlled fuel pump, at idle or low engine speeds there is a relatively low fuel flow rate through the pump which provides limited cooling of the pump. Excessive heating of the fuel pump can cause vapor formation in the liquid fuel, decreased efficiency of the pump and even failure of the pump in use. Further, the fuel may become heated in different applications causing excessive fuel vapor formation which can cause vapor lock. Accordingly, it is desirable to also cool the fuel in addition to the fuel pump to reduce vapor formation and the likelihood of vapor lock.

SUMMARY OF THE INVENTION

A fuel system has a fuel pump controlled and driven by a pulse width modulated drive to deliver fuel to the engine at a rate corresponding to the engine demand and a recirculation cooler or heat exchanger which receives a portion of fuel discharged from the fuel pump, cools that fuel, and then returns the cooled fuel to the inlet of the fuel pump to cool the pump as the cooled fuel flows through the pump. The recirculation cooler is preferably formed of a material of high thermal conductivity and has a coolant passage adjacent to a fuel passage to reduce the temperature of the fuel that flows through the recirculation cooler. Desirably, the cooler fuel provided by the recirculation cooler to the inlet of the fuel pump supplements the cooling of the fuel pump motor and reduces fuel vapor formation in the fuel. In one form, the recirculation cooler comprises a block having passages drilled, bored or otherwise formed therein to define the separate coolant passage and the fuel passage. In another form, the recirculation cooler has a generally cylindrical housing with a coiled tube received in the housing and defining the fuel passage with the coolant passage defined within the interior of the cylindrical housing. In either embodiment, heat from the fuel in the recirculation cooler is transferred to the recirculation cooler material and the cooling water to reduce the temperature of the fuel.

Objects, features and advantages of this invention include providing a recirculation cooler for engine fuel systems which supplements the cooling of the fuel pump, enables use of a pulse width modulated or otherwise variably controlled electric fuel pump, permits use of an electric motor fuel pump in high heat fuel system applications, reduces vapor formation in the liquid fuel, prevents vapor lock of the fuel pump, reduces the temperature of fuel discharged from the fuel pump, and is of relatively simple design, economical manufacture and assembly and in service has a long, useful life.

BRIEF DESCRIPTION OF THE DRAWINGS

These and other objects, features and advantages of this invention will be apparent from the following detailed description of the preferred embodiments and best mode, appended claims and accompanying drawings in which:

DETAILED DESCRIPTION OF THE PREFERRED EMBODIMENTS

Figure 1:
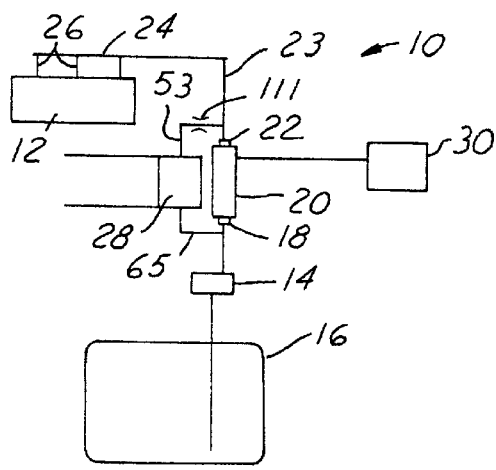
FIG. 1 is a schematic view of a fuel system for a marine engine having a recirculation cooler embodying the present invention.

Referring in more detail to the drawings, FIG. 1 illustrates a fuel system 10 for a marine internal combustion engine 12 with a low pressure pump 14 which draws fuel from a fuel tank 16 and delivers it to an inlet 18 of a high pressure fuel pump assembly 20. The high pressure fuel pump 20 increases the pressure of fuel received therein and discharges fuel under pressure through an outlet 22 and fuel line 23 to a fuel rail 24 and associated fuel injectors 26 for delivery to the combustion chambers of the engine 12. A recirculation cooler 28 connected across the high pressure fuel pump 20 receives a portion of the fuel discharged from the fuel pump outlet 22 during at least some fuel flow conditions. Fuel which flows through the recirculation cooler 28 is cooled and returned to the inlet 18 of the fuel pump 20 to reduce fuel vapor formation and to supplement the cooling of the fuel pump 20.

As shown in FIG. 1, the fuel system 10 is a returnless or no-return type fuel system wherein fuel is delivered to the engine 12 at a rate generally equal to the fuel demand of the operating engine 12. To accomplish this, the electric motor of the fuel pump 20 may be powered by a pulse width modulated drive 30 which varies the application of electrical power to the electric motor of the fuel pump 20 to vary the operating speed of the fuel pump and thus the flow rate of fuel discharged from the fuel pump 20 according to the fuel demand of the engine 12. Desirably, the pulse width modulated drive 30 operates to maintain a constant pressure downstream of the fuel pump 20 over a wide range of fuel flow rates from the high pressure fuel pump 20. Desirably, to provide fuel to the recirculaton cooler 28 and also to the engine 12, the pulse width modulated drive 30 controls the fuel pump 20 to deliver fuel at a rate slightly greater than the fuel demand of the engine. The fuel in excess of the engine fuel demand may flow through the recirculation cooler without adversely affecting the performance of the operating engine 12.

The fuel pump 20 may be of substantially any kind such as, but not limited to, a turbine or regenerative type fuel pump such as that disclosed in U.S. Pat. No. 5,257,916 or a gear rotor type fuel pump, such as that disclosed in U.S. Pat. No. 5,219,277 the disclosure of each of which is incorporated herein by reference in its entirety.

Figure 2:
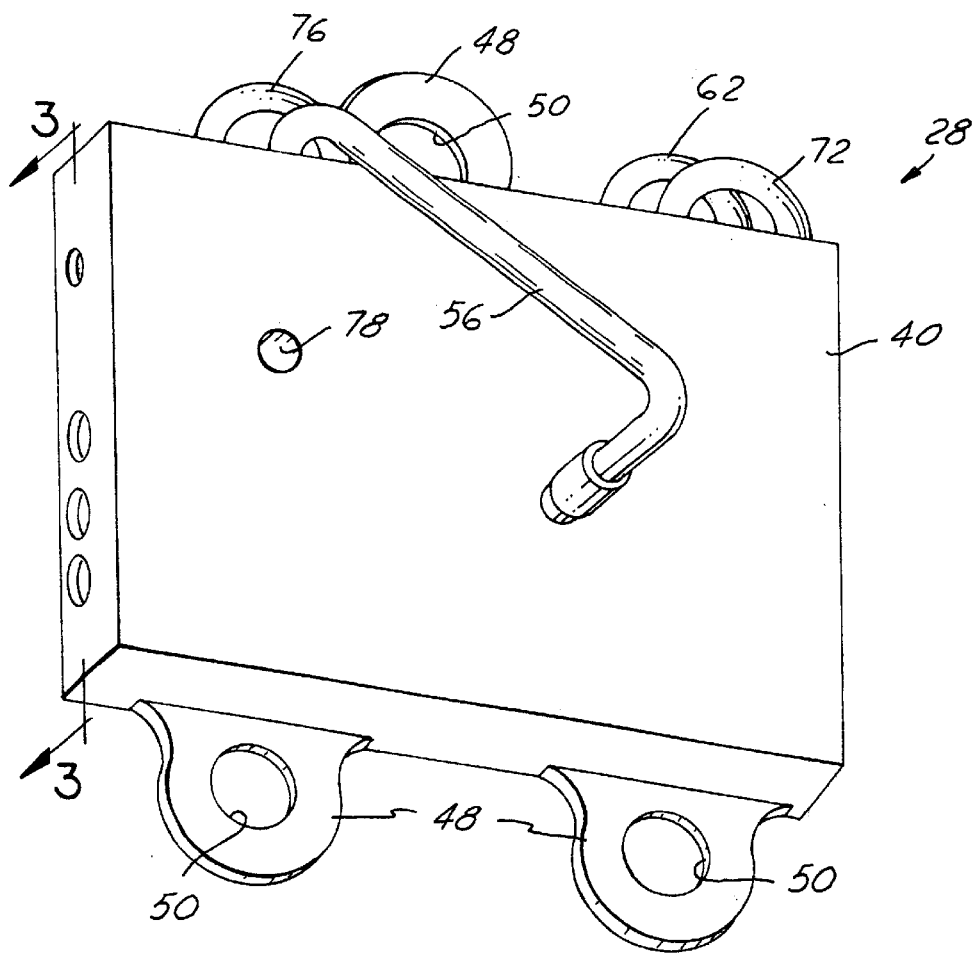
FIG. 2 is a perspective view of a recirculation cooler according to the present invention.
Figure 3:
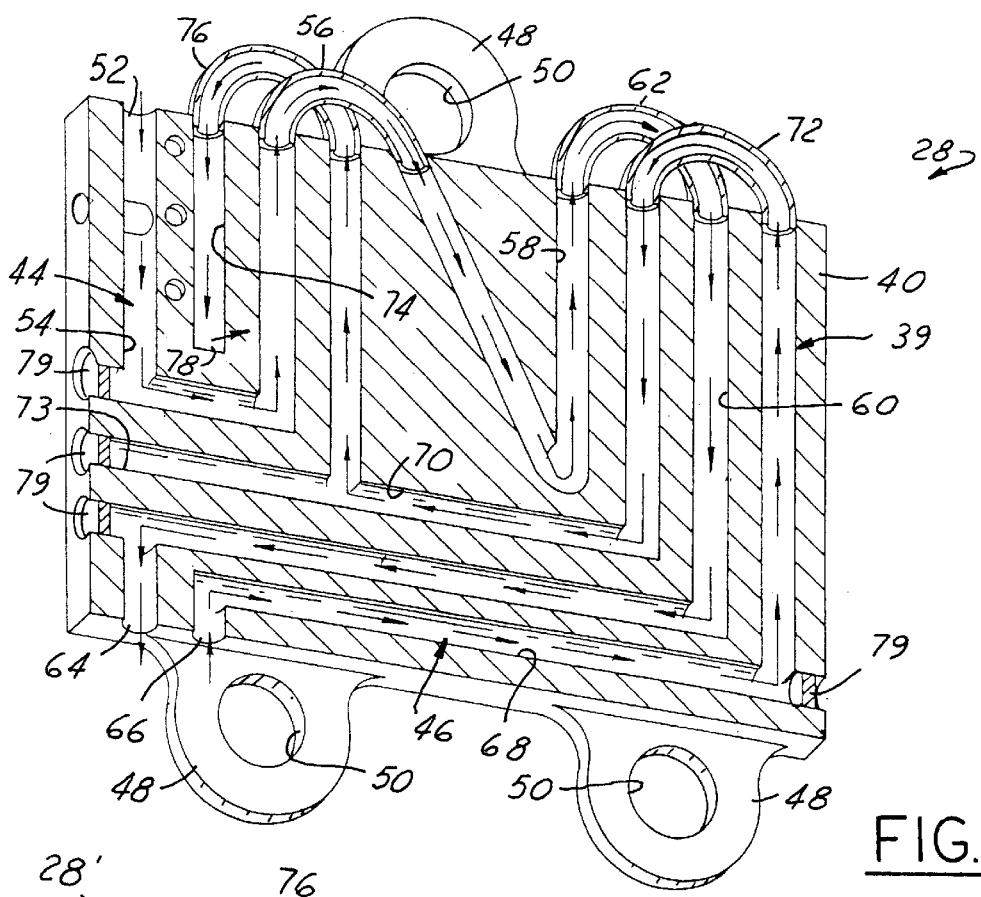
FIG. 3 is a cross-sectional view taken along line 3—3 of FIG. 2.

As shown in FIGS. 2 and 3, the recirculation cooler 28 is preferably fabricated by drilling various flow paths 39 in a block 40 to define in the block 40 a fuel passage 44 and a separate coolant passage 46 adjacent to the fuel passage 44. One or more mounting lugs 48 extending from the block 40 have holes 50 through which screws may be received to connect the recirculation cooler 28 to an adjacent component of the fuel system or vehicle. Both the fuel passage 44 and the coolant passage 46 are preferably separately defined by a plurality of interconnected holes or flow paths 39 in the block 40.

More specifically, as shown in FIG. 3, the fuel passage 44 begins at a fuel inlet 52 of the recirculation cooler 28 which is in communication with the outlet 22 of the fuel pump 20 through a conduit 53 (FIG. 1) and a first, U-shaped portion 54 of the fuel passage 44. This first portion 54 of the fuel passage 44 in turn leads to an exterior conduit 56 which joins the first portion 54 with a second portion 58. The second portion 58 in turn is connected to a third portion 60 of the fuel passage 44 through a second exterior conduit 62. The third Z-shaped portion 60 of the fuel passage 44 leads to a fuel outlet 64 of the recirculation cooler 28 which is connected with the inlet 18 of the high pressure fuel pump 20 through a conduit 65 (FIG. 1).

The coolant passage 46 begins at a coolant inlet 66 of the recirculation cooler 28 which is in communication with a coolant source, such as water from a river, a lake, stream or other source of water when used with a marine engine, or an alternate coolant source such as a radiator for use with engines other than marine engines potentially including gases as well as liquids. A first Z-shaped portion 68 of the coolant passage 46 is connected to a second, generally U-shaped portion 70 of the coolant passage 46 by a third exterior conduit 72. A branch 73 of the U-shaped portion 70 is preferably closed by a plug 79. The second portion 70 of the coolant passage 46 is in turn connected to a third portion 74 through a fourth exterior conduit 76. This third portion 74 of the coolant passage 46 leads to a coolant outlet 78 of the recirculation cooler 28 through which coolant is discharged from the recirculation cooler 28. Various plugs 79 close off openings to the exterior of the housing.

Figure 4:
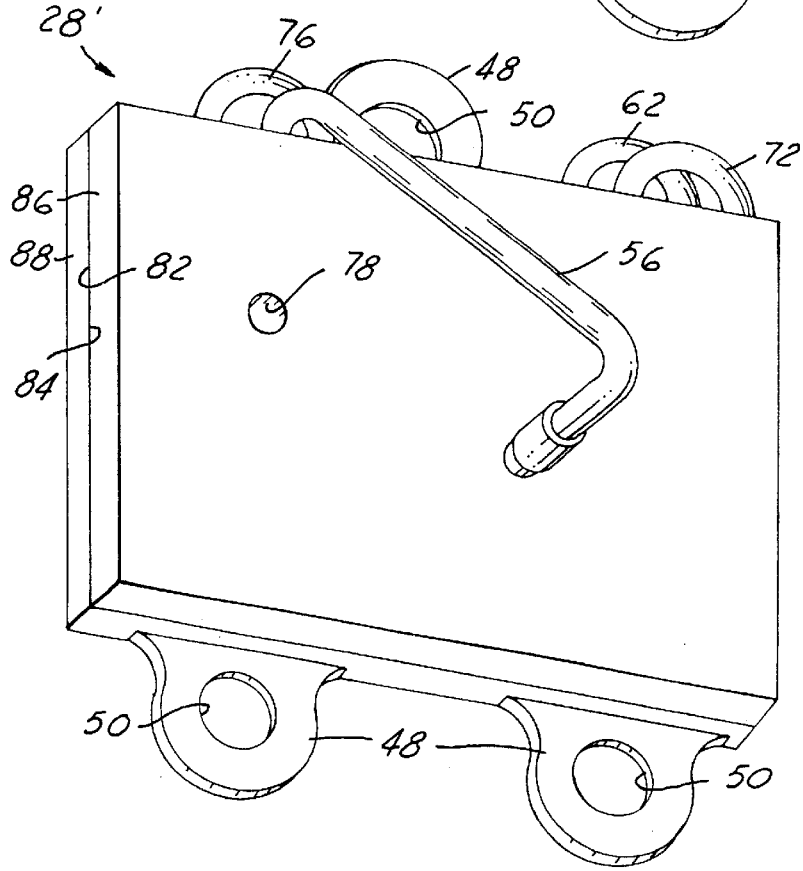
FIG. 4 is a perspective view of a modified recirculation cooler formed from two mated plates.
Figure 5:
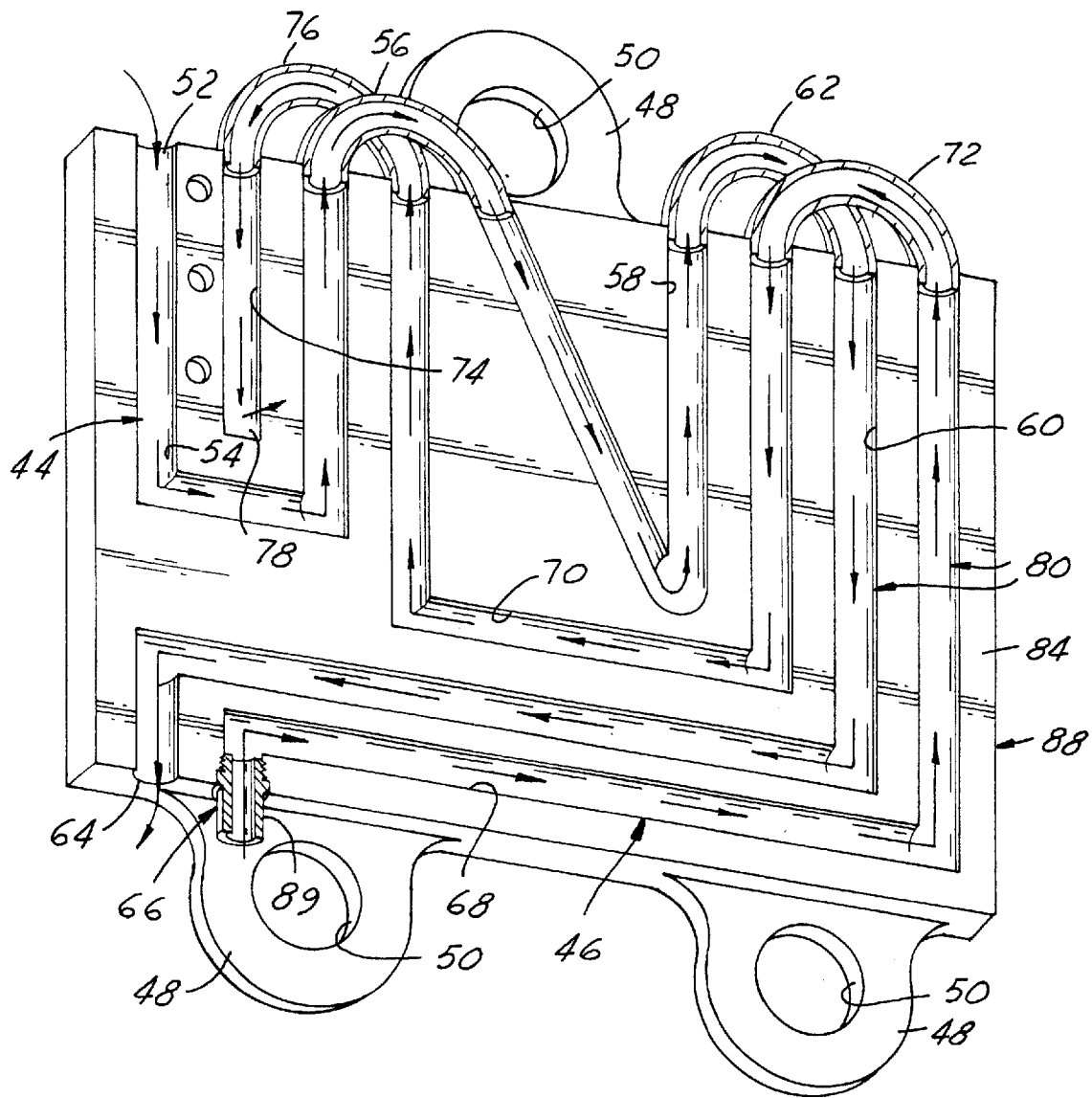
FIG. 5 is a top view of a bottom plate of the recirculation cooler of FIG. 4.

Alternatively, the fuel passage 44 and coolant passage 46 may be defined completely within the block 39 without any external conduits. As another alternative, as shown in FIGS. 4 and 5, a recirculation cooler 28' may have the fuel passage 44 and coolant passage 46 defined by grooves 80 formed in mating faces 82, 84 of two flat plates 86, 88. The grooves 80 preferably define similar fuel and coolant passages 44, 46 as those described with reference to FIGS. 2 and 3 with the same reference numbers applied to corresponding portions of the passages. The plugs 79 are not be needed because openings to the exterior of the housing are not needed when the passages 44, 46 are formed in the faces 82, 84 of the plates 86, 88. Additionally, fluid fittings 89 such as that shown at the coolant inlet 66 may be provided at each opening to the exterior of the recirculation cooler 28' to facilitate connecting the various conduits to the recirculation cooler 28'.

Thus, as shown, the fuel passage 44 and coolant passage 46 are completely separate from one another within the recirculation cooler 28 or 28' and are relatively convoluted to provide an increase in their surface area adjacent to each other and within the recirculation cooler 28, 28'. The recirculation cooler 28, 28' is preferably formed of a material having high thermal conductivity, such as copper, aluminum or stainless steel, to increase the heat transfer from the hot fuel to the material of the recirculation cooler 28, 28' and the coolant. Thus, the temperature of the fuel which enters the recirculation cooler 28, 28' is reduced before the fuel is routed back to the inlet 18 of the high pressure fuel pump 20 to provide cooler fuel to the inlet 18 of the fuel pump 20 and thereby cool the fuel pump and reduce or prevent fuel vapor formation.

Figure 6:
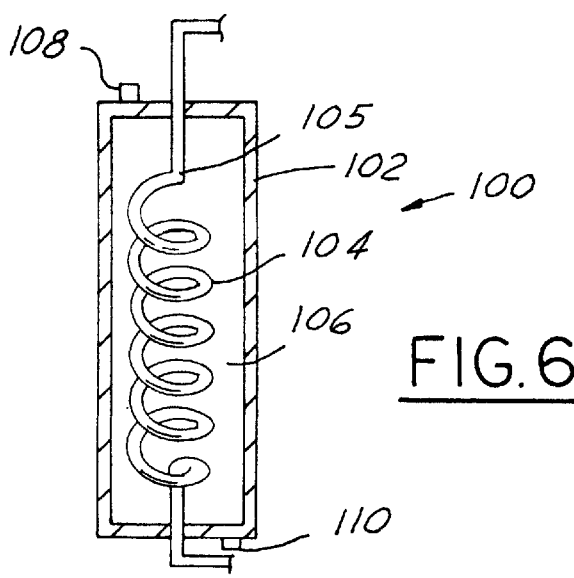
FIG. 6 is a cross sectional view of a recirculation cooler according to a second embodiment of the invention.

A modified recirculation cooler 100 is shown in FIG. 6. This modified recirculation cooler 100 has an outer generally cylindrical housing 102 in which is received a tubular coil 104 which communicates at one end with the outlet 22 of the fuel pump 20 and at its other end with the inlet 18 of the fuel pump to define a fuel passage 105 through the recirculation cooler 100. A coolant passage 106 is defined between the outer housing 102 and tubular coil 104. Coolant from a source enters the housing 102 through an inlet 108 and is discharged through an outlet 110 of the housing 102. The coolant flows around the tubular coil 104 to cool the coil and fuel flowing through the tubular coil 104. Thus, as with cooler 28, the temperature of fuel which flows through the recirculation cooler 100 is reduced before being delivered to the fuel pump 20 to cool the fuel pump 20 in use and reduce or prevent fuel vapor formation.

Figure 7:
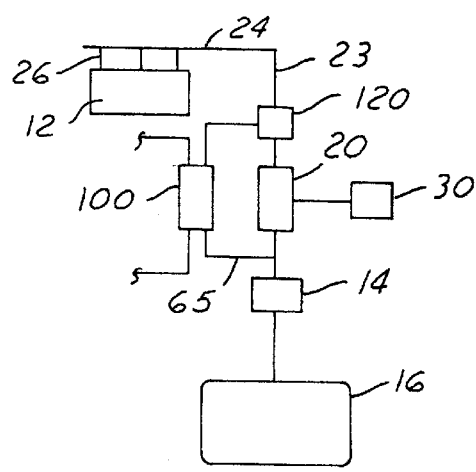
FIG. 7 is a schematic view of a fuel system for a marine engine having a modified recirculation cooler.

In each embodiment of the recirculation cooler 28, 28', 100, the fuel inlet of the recirculation cooler 28, 28', 100 is preferably directly connected to the fuel line 23 downstream of the fuel pump 20 with a restricted size orifice 111 in the conduit 53 or tubular coil 104 which limits or controls the flow rate of fuel which is bypassed from the fuel line 23 to the recirculation cooler 28, 28', 100. Alternatively, as shown in FIG. 7, a demand fuel pressure regulator 120 may be connected between the recirculation cooler 28, 28' or 100 and the fuel pump 22 outlet to bypass fuel discharged from the fuel pump 20 in excess of the engine's fuel demand through the recirculation cooler 28, 28' or 100. A suitable demand pressure regulator 120 is disclosed in U.S. Pat. No. 5,579,739, the disclosure of which is incorporated herein by reference in its entirety. A valve may also be disposed between the outlet 22 of the fuel pump 20 and the fuel inlet of the recirculation cooler 28, 28', 100 to prevent fuel from being bypassed through the recirculation cooler 28, 28', 100 during high fuel demand conditions of the engine 12. During such high fuel demand conditions of the engine 12, there is a high flow rate of fuel through the fuel pump 20 to cool the fuel pump 20. Thus, the secondary fuel flow through the recirculation cooler 28, 100 may not be needed to sufficiently cool the fuel pump 20.

The recirculation cooler 28, 28', 100 supplements the cooling effect of the fuel flow through the fuel pump 20 and reduces or prevents fuel vapor formation. This is especially important in high heat applications as well as with a pulse width modulated or otherwise variably controlled fuel pump 20 at low engine speeds. At such low engine speed conditions, there is a relatively low fuel flow rate through the fuel pump 20 which is inadequate to sufficiently cool the fuel pump 20 and can cause the fuel to become heated increasing fuel vapor formation. Thus, the delivery of the cooler fuel from the recirculation cooler 28, 28', 100 to the high pressure fuel pump 20 at these low engine speeds or other high heat conditions, is essential to prevent overheating of the fuel pump 20 and to reduce fuel vapor formation.

What is claimed is:

1. A fuel system with a recirculation cooler for an internal combustion engine, comprising:
   an electric fuel pump having a fuel inlet and a fuel outlet for supplying fuel at a varying flow rate under high pressure to the engine;
   a cooler housing;
   a fuel passage defined at least in part in the hosing having a fuel inlet in communication with the outlet of the electric fuel pump, and a fuel outlet in communication with the fuel inlet of the electric fuel pump;
   a coolant passage defined at least in part in the housing separate from and generally adjacent to the fuel passage having a coolant inlet in communication with a source of coolant, and a coolant outlet from which coolant is discharged from the recirculation cooler;
   a drive controlling the electric fuel pump to vary the flow rate of fuel under high pressure delivered to the engine in response to the engine fuel demand and to circulate fuel through the cooler at least during engine low fuel demand conditions;
   whereby under at least engine low fuel demand conditions, a portion of the fuel discharged from the outlet of the electric fuel pump flows into the recirculation cooler through the fuel inlet thereof and is cooled before flowing out of the recirculation cooler housing through the fuel outlet to the inlet of the electric fuel pump to cool the electric fuel pump and reduce fuel vapor formation.

2. The fuel system of claim 1 wherein the housing comprises a first plate and a second plate which, when mated together, define at least in part the fuel passage and the coolant passage.

3. The fuel system of claim 2 wherein the first plate and second plate are formed of a material having high thermal conductivity.

4. The fuel system of claim 3 wherein the first plate and second plate are metal and are releasably connected together.

5. The fuel system of claim 1 wherein which also comprises a tube received in and defining the fuel passage with the housing defining at least in part the coolant passage.

6. The fuel system of claim 5 wherein the housing is generally cylindrical and said tube extends through the housing with coolant flowing through the housing in direct contact with the tube.

7. The fuel system of claim 2 wherein the fuel passage and coolant passage are defined at least in part by cooperating slots formed in both the first plate and second plate and are generally circuitous and adjacent to one another to increase the heat transfer from the fuel in the fuel passage.

8. The fuel system of claim 1 wherein a restriction between the outlet of the fuel pump and the inlet of the fuel pump controls the flow of fuel to the recirculation cooler.

9. The fuel system of claim 1 which also comprises a valve selectively communicating the outlet of the fuel pump with the fuel passage.

10. The fuel system of claim 1 which also comprises at least one conduit having a pair of ends each connected at each end to the housing and communicating with separate portions of the fuel passage at each end to define in part the fuel passage.

11. The fuel system of claim 10 wherein at least one of said conduit is formed of a material having high thermal conductivity.

12. The fuel system of claim 1 which also comprises at least one conduit having a pair of ends each connected at each end to the housing and communicated with separate portions of the coolant passage at each end to define in part the coolant passage.

13. The fuel system of claim 1 wherein the housing comprises a single block.

14. The fuel system of claim 13 wherein the fuel passage and coolant passage are defined at least in part by flow paths formed in the block.

15. A fuel system for a marine engine, comprising:
   an engine;
   a low pressure pump having a fuel inlet and a fuel outlet supplying fuel under a low pressure;
   an electric fuel pump having an inlet connected to the fuel outlet of the low pressure pump and an outlet for supplying fuel at a varying flow rate under high pressure for delivery to the engine;
   a recirculation cooler having a fuel passage with an inlet in communication with the outlet of the electric fuel pump and a fuel outlet in communication with the inlet of the electric fuel pump, and a coolant passage with a coolant inlet in communication with a supply of coolant and a coolant outlet through which coolant is discharged from the recirculation cooler;
   a drive controlling the electric fuel pump to vary the flow rate of fuel under high pressure delivered to the engine in response to the engine fuel demand and to circulate fuel through the cooler at least during engine low fuel demand conditions;
   whereby, under at least engine low fuel demand conditions, a portion of the high pressure fuel discharged from the electric fuel pump flows through the fuel passage of the recirculation cooler wherein its temperature is reduced and this cooled fuel is discharged from the recirculation cooler and drawn into the electric fuel pump to cool the electric fuel pump and reduced fuel vapor formation.

16. The fuel system of claim 15 wherein the recirculation cooler comprises a first plate and a second plate which, when mated together, define at least in part the fuel passage and the coolant passage.

17. The fuel system of claim 16 wherein the first plate and second plate are formed of a material having high thermal conductivity.

18. The fuel system of claim 17 wherein the first plate and second plate are metal and are releasably connected together.

19. The fuel system of claim 16 wherein the fuel passage and coolant passage are defined by slots formed in both the first plate and second plate and are generally circuitous and adjacent to one another to increase the heat transfer from the fuel in the fuel passage.

20. The fuel system of claim 15 wherein the recirculation cooler comprises a housing with a tube received in the housing and defining the fuel passage with the housing defining at least in part the coolant passage.

21. The fuel system of claim 20 wherein the housing is generally cylindrical and said tube extends through the housing with coolant flowing through the housing in direct contact with the tube.

22. The fuel system of claim 15 wherein a restriction between the outlet of the fuel pump and the inlet of the fuel pump controls the flow of fuel to the recirculation cooler.

23. The fuel system of claim 15 which also comprises a valve selectively communicating the outlet of the fuel pump with the fuel passage.

24. The fuel system of claim 15 wherein the drive comprises a pulse width modulated controller connected to the electric fuel pump and adapted to vary the application of electrical power to the electric fuel pump to vary the flow rate of fuel supplied to the engine to correspond to the engine fuel demand.

25. The fuel system of claim 24 wherein the pulse width modulated controller is adapted to provide a fuel flow rate form the electric fuel pump at least somewhat greater than the engine fuel demand so that a portion of the fuel discharged from the electric fuel pump is routed through the recirculation cooler without significantly affecting the performance of the engine.

26. The fuel system of claim 15 wherein the housing comprises a single block.

27. The fuel system of claim 26 wherein the fuel passage and coolant passage are defined at least in part by flow paths formed in the block.

28. The fuel system of claim 1 which also comprises an engine with fuel injectors and none of the high pressure fuel supplied by the electric fuel pump to the engine is returned from the engine.

29. The fuel system of claim 1 wherein the drive comprises a pulse width modulated controller connected to the electric fuel pump to vary the application of electrical power to the electric pump to vary the flow rate of fuel supplied to the engine in response to the engine fuel demand.

30. The fuel system of claim 29 wherein the pulse width modulated controller is configured to provide a fuel flow rate of high pressure fuel from the electric fuel pump which is somewhat greater than the engine fuel demand so that a portion of the high pressure fuel from the electric fuel pump is routed through the cooler without significantly affecting the performance of the engine.

31. The fuel system of claim 1 wherein the drive controls the electric fuel pump to discharge high pressure fuel from the outlet of the electric pump at a rate somewhat greater than the engine fuel demand.

32. The fuel system of claim 1 which also comprises a restrictive orifice restricting the maximum rate of flow of fuel through the cooler.

33. The fuel system of claim 31 which also comprises a demand pressure regulator connected between the outlet of the electric fuel pump and the cooler for controlling the flow of fuel through the cooler.

34. The fuel system of claim 15 which also comprises an engine with fuel injectors and none of the high pressure fuel supplied by the electric fuel pump to the engine is returned from the engine.

35. The fuel system of claim 34 wherein the drive comprises a pulse width modulated controller connected to the electric fuel pump to vary the application of electrical power to the electric pump to vary the flow rate of fuel supplied to the engine in response to the engine fuel demand.

36. The fuel system of claim 15 wherein the drive controls the electric fuel pump to discharge high pressure fuel from the outlet of the electric pump at a rate somewhat greater than the engine fuel demand.

37. The fuel system of claim 15 which also comprises a restrictive orifice restricting the maximum rate of flow of fuel through the cooler.

38. The fuel system of claim 15 which also comprises a demand pressure regulator connected between the outlet of the electric fuel pump and the cooler for controlling the flow of fuel through the cooler.

* * * * *

UNITED STATES PATENT AND TRADEMARK OFFICE
CERTIFICATE OF CORRECTION

PATENT NO. : 6,457,460 B1
DATED : October 1, 2002
INVENTOR(S) : Kirk D. Doane

It is certified that error appears in the above-identified patent and that said Letters Patent is hereby corrected as shown below:

Column 5,
Line 10, delete "hosing" and insert -- housing --.
Line 42, delete "wherein".

Column 6,
Line 38, delete "reduced" and insert -- reduce --.

Column 7,
Line 20, delete "ofthe" and insert -- of the --.

Column 8,
Lines 3 and 23, delete "ofthe" and insert -- of the --.

Signed and Sealed this

Eighteenth Day of February, 2003

JAMES E. ROGAN
*Director of the United States Patent and Trademark Office*